(12) United States Patent
Ito et al.

(10) Patent No.: US 11,879,994 B2
(45) Date of Patent: Jan. 23, 2024

(54) DATA PROCESSING APPARATUS, MOVING OBJECT APPARATUS AND DATA PROCESSING METHOD

(71) Applicant: Kabushiki Kaisha Toshiba, Tokyo (JP)

(72) Inventors: Yusuke Ito, Yokohama Kanagawa (JP); Kenichi Shimoyama, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 654 days.

(21) Appl. No.: 16/804,578

(22) Filed: Feb. 28, 2020

(65) Prior Publication Data

US 2021/0080545 A1   Mar. 18, 2021

(30) Foreign Application Priority Data

Sep. 18, 2019 (JP) ................. 2019-168956

(51) Int. Cl.
  *G01S 7/48* (2006.01)
  *G01S 17/50* (2006.01)
  *G01S 17/10* (2020.01)
  *G06K 7/10* (2006.01)

(52) U.S. Cl.
  CPC ............ *G01S 7/4808* (2013.01); *G01S 17/10* (2013.01); *G01S 17/50* (2013.01); *G05D 2201/0216* (2013.01); *G06K 7/10099* (2013.01)

(58) Field of Classification Search
  CPC ...... G01S 7/4802; G01S 7/4808; G01S 17/10; G01S 17/50; G06K 7/10; G06K 7/10099; G05D 2201/0216
  See application file for complete search history.

(56) References Cited

U.S. PATENT DOCUMENTS

| 10,800,548 | B2* | 10/2020 | Wang .................... B64C 39/024 |
| 2002/0139853 | A1* | 10/2002 | Tsikos ...................... G06K 7/10 235/462.01 |
| 2018/0364357 | A1 | 12/2018 | Hasegawa |
| 2019/0306284 | A1* | 10/2019 | Fu ........................... G01S 15/50 |
| 2019/0325174 | A1* | 10/2019 | Ashaari ............. G06K 7/10475 |

FOREIGN PATENT DOCUMENTS

| JP | 2003-028959 A | 1/2003 |
| JP | 2011-170486 A | 9/2011 |
| JP | 2015-121408 | 7/2015 |
| JP | 2017-102700 A | 6/2017 |
| JP | 2019-3513 A | 1/2019 |
| JP | 2019-096099 A | 6/2019 |

* cited by examiner

*Primary Examiner* — Eric L Bolda
(74) *Attorney, Agent, or Firm* — Knobbe, Martens, Olson & Bear, LLP

(57) ABSTRACT

According to one embodiment, a data processing apparatus includes a data processing unit and an acquisition unit. The data processing unit is configured to perform data processing on measurement data according to a distance to a marker, the measurement data being obtained by a ranging sensor attached to a moving object and measuring the marker of which surface includes a pattern with different reflection characteristics. The acquisition unit is configured to acquire operation information of the moving object based on data obtained by the data processing.

17 Claims, 11 Drawing Sheets

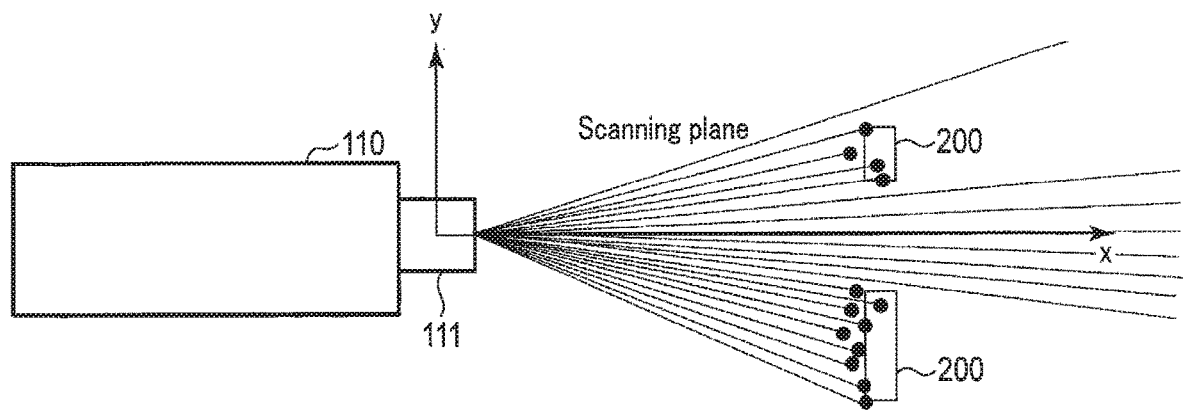
F I G. 2B
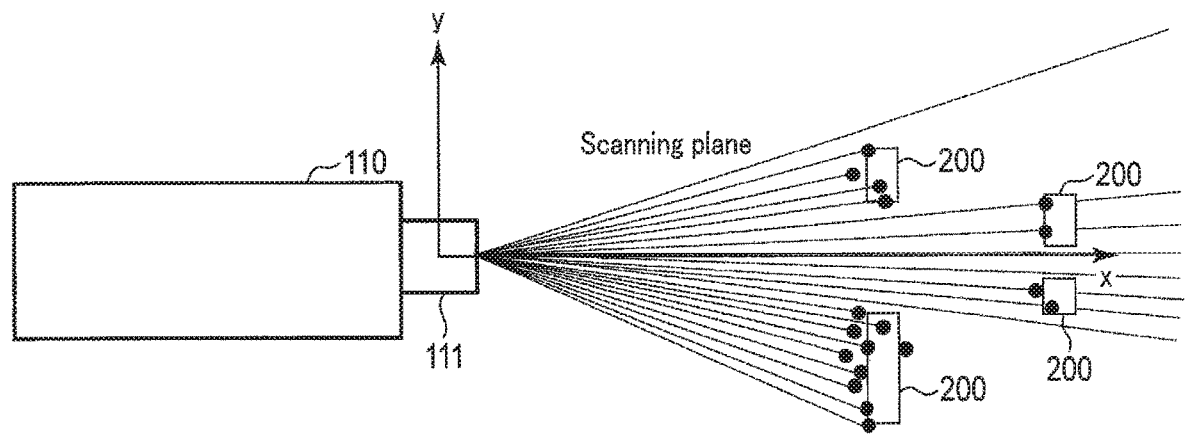
F I G. 2C

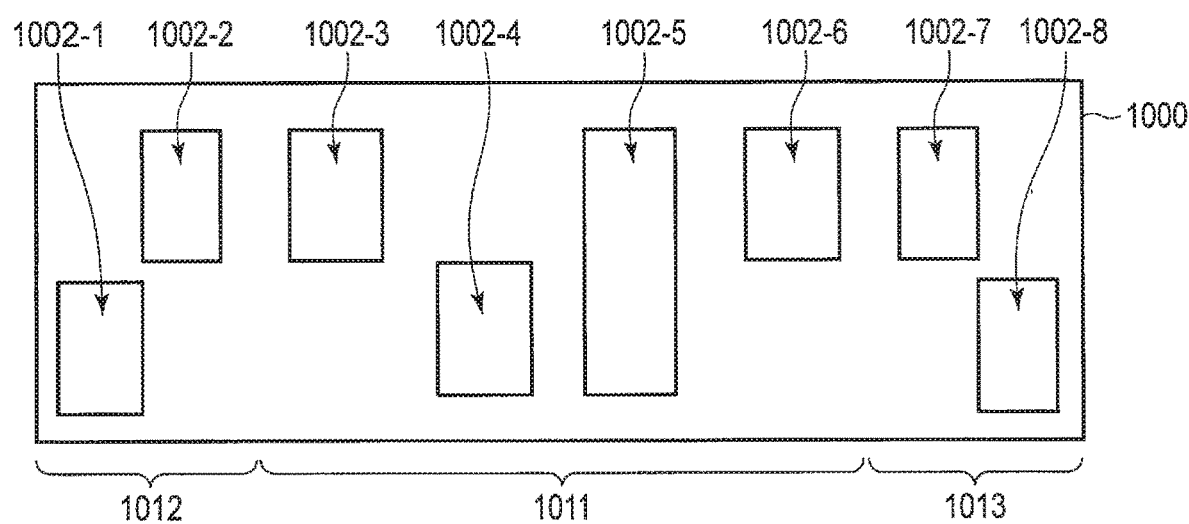
F I G. 10

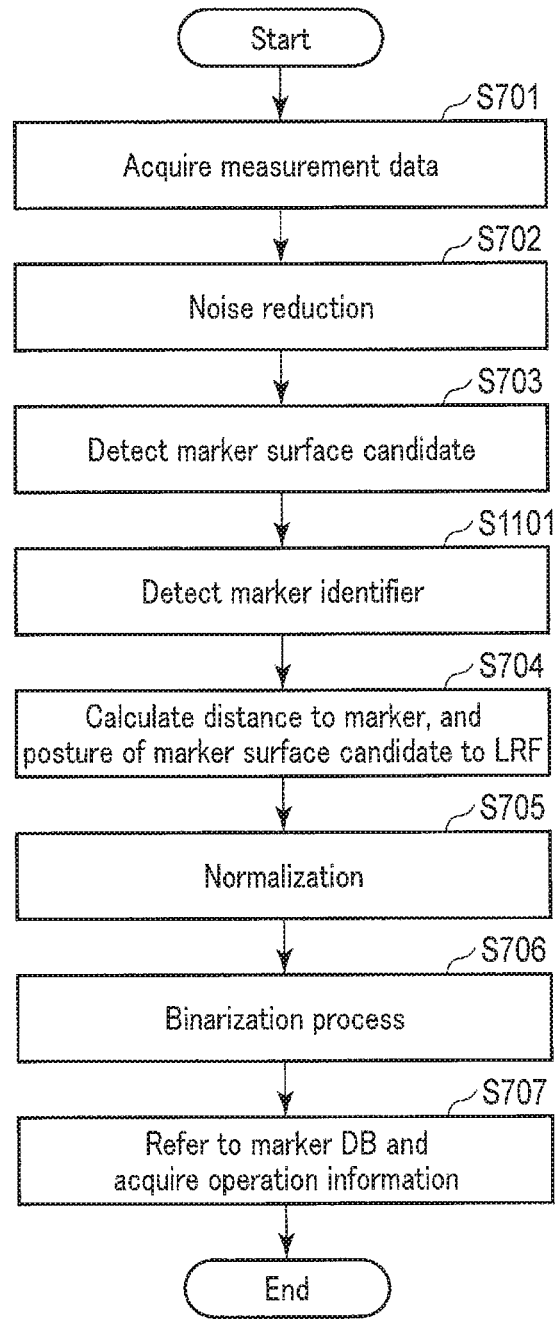
F I G. 11

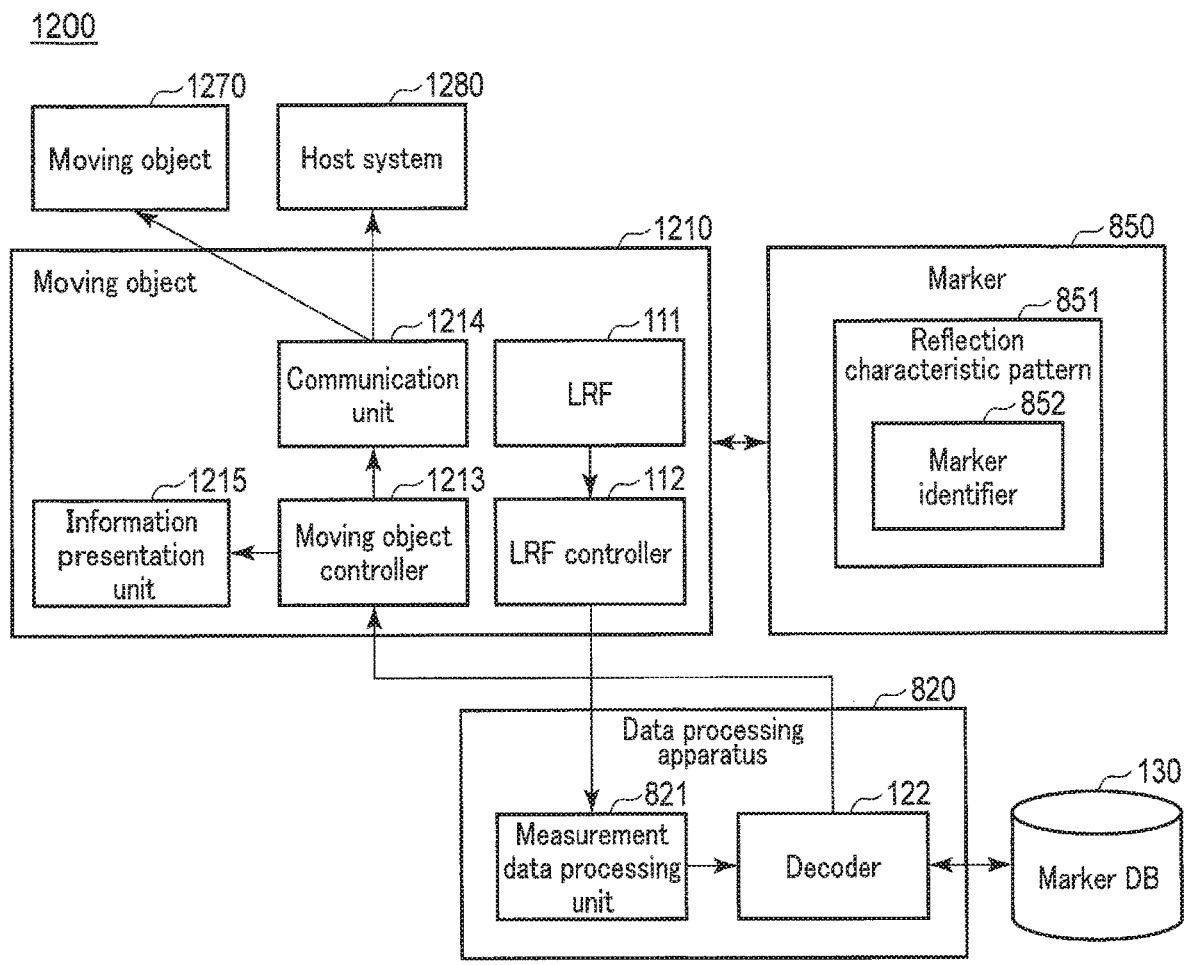
F I G. 12

DATA PROCESSING APPARATUS, MOVING OBJECT APPARATUS AND DATA PROCESSING METHOD

CROSS-REFERENCE TO RELATED APPLICATIONS

This application is based upon and claims the benefit of priority from Japanese Patent Application No. 2019-168956, filed Sep. 18, 2019, the entire contents of which are incorporated herein by reference.

FIELD

Embodiments described herein relate generally to a data processing apparatus, a moving object apparatus and a data processing method.

BACKGROUND

A moving object apparatus with a laser range finder (LRF) can measure its surrounding environment. The LRF measures the environment by emitting detection waves in a scanning manner and detecting reflection waves of the detection waves.

It is difficult to recognize a small change in shape with the LRF due to noise or a distance precision of the LRF.

BRIEF DESCRIPTION OF THE DRAWINGS

FIG. 2B is a top view showing an example where the marker shown in FIG. 2A includes a single-plane marker surface.

FIG. 2C is a top view showing an example where the marker shown in FIG. 2A includes a multiple-plane marker surface.

FIGS. 9 and 10 are elevational views showing examples of the marker shown in FIG. 8.

FIG. 11 is a flowchart showing a data processing method performed by the data processing apparatus shown in FIG. 8.

FIG. 12 is a block diagram showing a moving object system according to a third embodiment.

DETAILED DESCRIPTION

According to one embodiment, a data processing apparatus includes a data processing unit and an acquisition unit. The data processing unit is configured to perform data processing on measurement data according to a distance to a marker, the measurement data being obtained by a ranging sensor attached to a moving object and measuring the marker of which surface includes a pattern with different reflection characteristics. The acquisition unit is configured to acquire operation information of the moving object based on data obtained by the data processing.

Hereinafter, embodiments will be described with reference to the accompanying drawings.

First Embodiment

Figure 1:
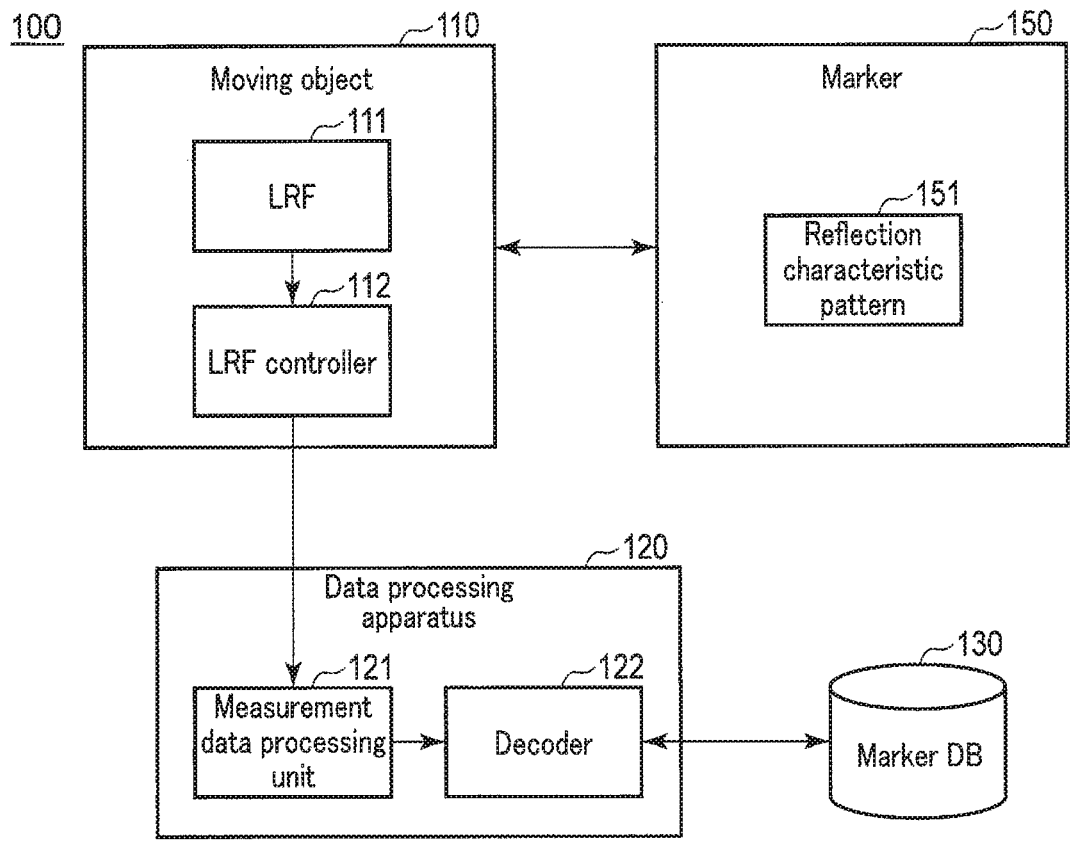
FIG. 1 is a block diagram showing a moving object system according to a first embodiment.

FIG. 1 schematically shows a configuration example of a moving object system 100 according to a first embodiment. As shown in FIG. 1, the moving object system 100 includes a moving object apparatus 110, a data processing apparatus 120 and a marker database (DB) 130. Hereinafter, the moving object apparatus will be simply referred to as a "moving object."

The moving object 110 is an apparatus configured to move such as a mobile robot. The moving object 110 includes a main body including a moving mechanism, a moving object controller for controlling the moving object 110, a laser range finder (LRF) 111 attached to the main body, and an LRF controller 112 for controlling the LRF ill. The LRF 111 corresponds to a ranging sensor. The moving mechanism may be of any kind. The moving object 110 may be a wheeled moving object which moves with wheels, a tracked moving object which moves with caterpillar wheels, or a walking moving object which walks with two or more legs. The moving object 110 may be a flying object apparatus.

The moving object controller controls the moving object 110 based on operation information of the moving object 110 acquired by the data processing apparatus 120. The operation information indicates information concerning an operation of the moving object. For example, the moving object controller controls the moving mechanism in accordance with the operation information of the moving object 110 acquired by the data processing apparatus 120.

The LRF 111 uses a laser beam to measure a surrounding environment of the moving object 110 and generates measurement data. A marker 150 is disposed in the environment. The marker 150 includes on its surface a reflection characteristic pattern 151 which is a pattern having different reflection characteristics. The marker 150 holds the operation information of the moving object 110 in the reflection characteristic pattern 151.

A one-dimensional scanning LRF is used as the LRF 111 in the present embodiment. In one example, the LRF 111 includes a light source, a mirror and a light detector. The light source generates a laser pulse at a constant time interval, and the mirror reflects the laser pulse to let it out of the LRF 111. The LRF 111 emits the laser pulse in a fan shape by rotating the mirror around a single rotation axis. The light detector detects the laser pulse reflected by a target in the environment. The LRF 111 determines a distance to the target based on, for example, a ToF (Time of Flight) method. The measurement data includes, e.g., sets of rotational angle and distance. The rotational angle shows an emitting direction of the laser pulse.

The LRF 111 is disposed on a front portion of the main body. The arrangement of the LRF 111 is not limited to the front portion of the main body. The LRF 111 may be disposed on a rear portion or a side portion of the main body. The LRF 111 is disposed at a height that allows for detection of the reflection characteristic pattern 151 of the marker 150. When the LRF 111 is disposed to perform laser light scanning in the level plane, the LRF 111 is disposed at the same height as the marker 150. However, the height position of the LRF 111 does not necessarily have to match with the height position of the marker 150. For example, the LRF 111 can be disposed to be inclined with respect to the level plane.

In addition, the LRF 111 has a measurable range (minimum and maximum) of distance that is fixed for each piece of hardware. The LRF 111 can measure a distance to a target when the target is within the measurable range of distance. On the other hand, the LRF 111 obtains a preset value, which depends on the hardware of the LRF 111, when the target is closer than the minimum distance to be measured or if there is no target up to the maximum distance. The preset value may be, for example, a distance value that cannot be measured by the LRF 111, that is, a distant value outside the measurable range. Specifically, the preset value may be 21 meters when the maximum distance is 20 meters.

The following explains the example where the LRF 111 is a one-dimensional, horizontally scanning LRF; however, the present embodiment is not limited to such and a two-dimensionally scanning LRF may also be used. A plurality of one-dimensionally scanning LRFs may also be used instead of the two-dimensionally scanning LRF.

The LRF controller 112 controls the start and end of measurements by the LRF 111. In addition, the LRF controller 112 outputs the measurement data generated by the LRF 111 to the data processing apparatus 120. Specifically, the LRF controller 112 transmits the measurement data to the data processing apparatus 120 through a non-illustrated communication interface. The communication between the moving object 110 and the data processing apparatus 120 may be performed using a well-known communication method. For example, the communication between the moving object 110 and the data processing apparatus 120 may be either a wireless communication or a wired communication. The LRF controller 112 may be a part of the moving object controller.

The data processing apparatus 120 acquires the measurement data from the LRF controller 112, and acquires the operation information of the moving object 110 from the marker database 130 based on the acquired measurement data. The data processing apparatus 120 outputs the acquired operation information to the moving object controller.

The data processing apparatus 120 includes a measurement data processing unit 121 and a decoder (also called "acquisition unit") 122. The measurement data from the LRF controller 112 is input to the measurement data processing unit 121. The measurement data processing unit 121 performs data processing on the measurement data according to the distance to the marker 150. The distance to the marker 150 indicates a distance between the LRF 111 or the moving object 110 and the marker 150. The details of the data processing will be described later.

The decoder 122 receives data obtained by the data processing for the measurement data from the measurement data processing unit 121. The decoder 122 acquires the operation information of the moving object 110 based on the received data. For example, the decoder 122 acquires the operation information of the moving object 110 by referring to the marker database 130 using the received data.

The marker database 130 stores a set of operation information of the moving object 110. The operation information includes information such as no-entry area information, speed-limit area information, one-way traffic area information, one-side traffic area information, human work presence/absence information, moving object presence/absence information, and absolute location information. The no-entry area information includes information specifying a no-entry area. The speed-limit area information includes information specifying an area where a speed limit is imposed and information indicating an upper speed limit. The one-way area information includes information specifying a one-way area and information showing a direction allowing passage. The one-side traffic area information includes information specifying a one-side traffic closure area. The human work presence/absence information includes information indicating whether or not a person is working in the area. The moving object presence/absence information includes information indicating whether or not another moving object is present in the surrounding area. The absolute location information includes information showing an absolute location of the installation site of the marker 150.

In the present embodiment, the marker database 130 stores the operation information in association with numerical values. Specifically, the no-entry area information is associated with 1-20, the speed-limit area information is associated with 21-40, the one-way area information is associated with 41-60, the one-side traffic area information is associated with 61-80, the human work presence/absence information is associated with 81-100, the moving object presence/absence information is associated with 101-120, and the absolute location information is associated with 121-140. The decoder 122, for example, decodes the data received from the measurement data processing unit 121, and acquires the operation information associated with the numeral value corresponding to the decoding result from the marker database 130.

In the example shown in FIG. 1, the data processing apparatus 120 is separate from the moving object 110. However, the data processing apparatus 120 may be provided on the moving object 110. In an exemplary instance, the data processing apparatus 120 may be included in the moving object controller. The marker database 130 may be provided in the moving object 110 as well.

Next, the marker 150 will be explained.

As described above, the marker 150 includes the reflection characteristic pattern 151. The reflection characteristic pattern 151 is formed by making use of differences in reflection characteristics on the surface of the marker 150 (hereinafter referred to as "marker surface.") Specifically, the marker 150 includes a first region and a second region having different reflection characteristics on the marker surface, so that the LRF 111 detects the return laser light reflected at the first region, while the laser light incident on the second region is not detected by the LRF 111. In one example, the reflection characteristic pattern 151 may be realized by forming the marker 150 into a shape with one or more slits using materials (such as aluminum) which reflect the laser light of the LRF 111. In another example, the reflection characteristic pattern 151 may be achieved by producing the marker 150 using materials which reflect the laser light of the LRF 111 and applying a liquid crystal or a laser absorption material to the marker surface.

Figure 2A:
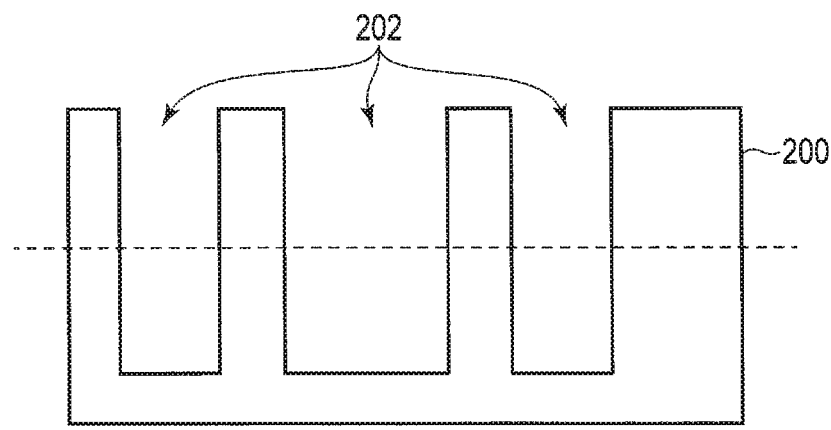
FIG. 2A is an elevational view showing one example of the marker shown in FIG. 1.

FIG. 2A is an elevational view schematically showing a marker 200 according to one embodiment. The marker 200 shown in FIG. 2A is one example of the marker 150 shown in FIG. 1. The marker 200 is made of materials reflecting the laser light from the LRF 111 and includes a plurality of slits 202. In FIG. 2A, the dashed line represents a scanning path of the laser light.

Figure 3A:
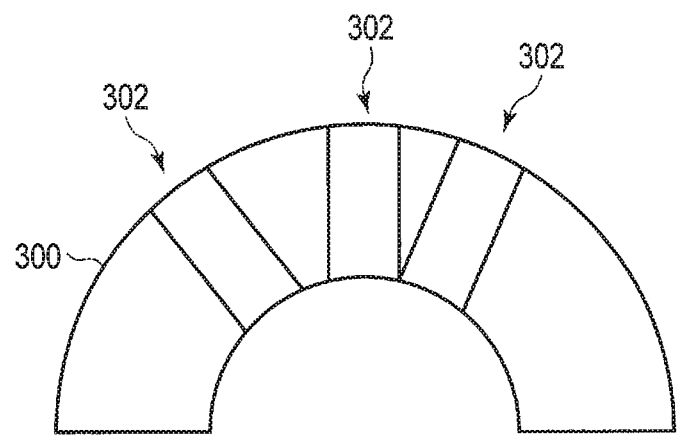
FIGS. 3A and 3B are top views showing further examples of the marker shown in FIG. 1.
Figure 3B:
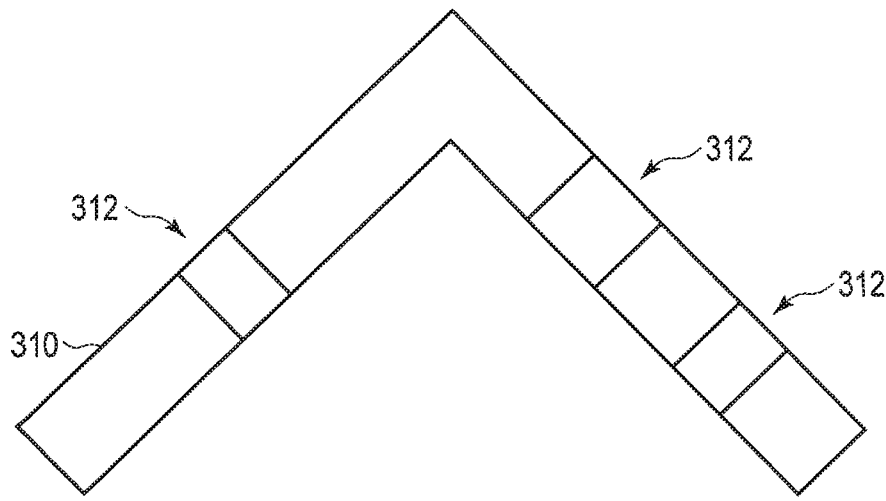

While the description uses an example where the marker includes the marker surface in a single plane as shown in FIG. 2B, the marker may include the marker surface in planes as shown in FIG. 2C. The shape of the marker is not limited to the shape where the marker surface is in a plane as shown in FIG. 2A. FIGS. 3A and 3B each are a top view schematically showing a marker 300 or 310 according to an embodiment. The markers 300 and 310 shown in respective FIGS. 3A and 3B are examples of the marker 150 shown in FIG. 1. The marker surface of the marker 300 shown in FIG. 3A is curved and has a reflection characteristic pattern formed with slits 302. The marker surface of the marker 310 shown in FIG. 3B is a combination of two orthogonal planes and its reflection characteristic pattern is formed with slits 312.

Figure 4:
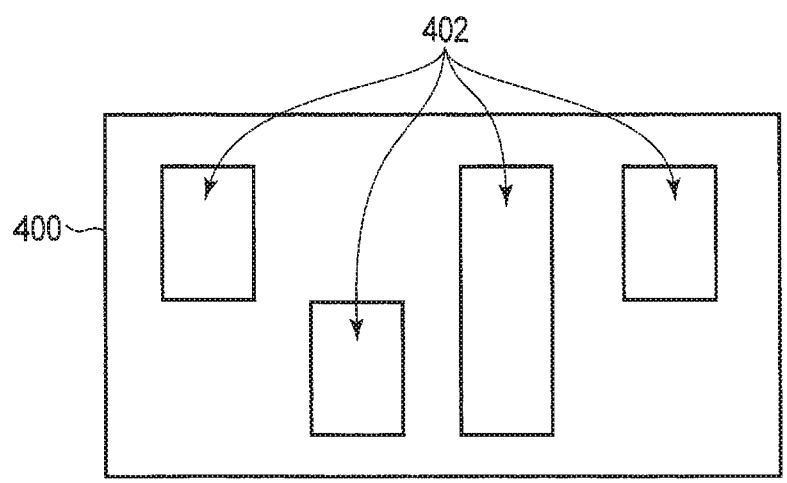
FIG. 4 is an elevational view showing another example of the marker shown in FIG. 1.

FIG. 4 is an elevational view schematically showing a marker 400 according to one embodiment. The marker 400 shown in FIG. 4 is an example of the marker 150 shown in FIG. 1. As shown in FIG. 4, the marker 400 includes a two-dimensional reflection characteristic pattern formed with slits 402. The two-dimensional reflection characteristic pattern is detectable using a two-dimensionally scanning LRF or a plurality of one-dimensionally scanning LRFs. By using a two-dimensional reflection characteristic pattern, it is possible to include more information in the reflection characteristic pattern.

With reference to FIGS. 5A to 6C, the data processing apparatus 120 will be explained.

The measurement data processing unit 121 performs data processing for the measurement data obtained by the LRF 111, according to the distance to the marker 150. The data processing includes a noise reduction of the measurement data, detection of a surface with a possibility of being the marker 150 (hereinafter referred to as "marker surface candidate"), normalization of the measurement data, binarization (encoding) of the measurement data, and so on.

The measurement data processing unit 121 removes noise from the measurement data by applying, for example, a median filter to the measurement data. The noise reduction may be performed by other methods.

The measurement data processing unit 121 performs line detection using a Hough transform on the measurement data that is subjected to the noise reduction, and detects the marker surface candidate. By such processing, the linear shaped marker surface as shown in FIG. 2A can be detected. The line detection may be performed by other methods. When detecting a two-dimensional marker surface as shown in FIG. 3A or 3B, the detection is performed by the Hough transform or other suitable detection algorithm.

When two or more marker surface candidates are detected, the measurement data processing unit 121 may calculate a probability of each marker surface candidate being a marker, and determine a priority order for performing the process. The probability of being a marker can be calculated based on, for example, shape information of the marker such as the length of the marker, and the shape of the marker surface candidate. The probability of the marker may be calculated by other methods.

The measurement data processing unit 121 extracts measurement data corresponding to the marker surface candidate from the measurement data that is subjected to the noise reduction, and normalizes the extracted measurement data.

In one example, the measurement data processing unit 121 first calculates the distance to the marker 150 based on at least one of the distances indicated by the extracted measurement data. For example, the measurement data processing unit 121 adopts the distance indicated by the data point closest to the center of the marker surface candidate as a distance to the marker 150. Alternatively, the measurement data processing unit 121 may average the distances indicated by the extracted measurement data to obtain the distance to the marker 150. Next, the measurement data processing unit 121 performs data interpolation or data thinning on the extracted measurement data according to the calculated distance to the marker 150. When the laser pulse is emitted in a fan shape, the number of data points corresponding to the marker surface candidate extracted from the measurement data decreases as the marker gets farther away from the LRF 111. The measurement data processing unit 121 performs the data interpolation when the calculated distance to the marker 150 is large and performs the data thinning when the calculated distance to the marker 150 is small. In such a manner, the measurement data corresponding to the marker surface candidate is converted into data comparable with that obtained when the marker 150 is a reference distance away from the LRF 111.

Figure 5A:
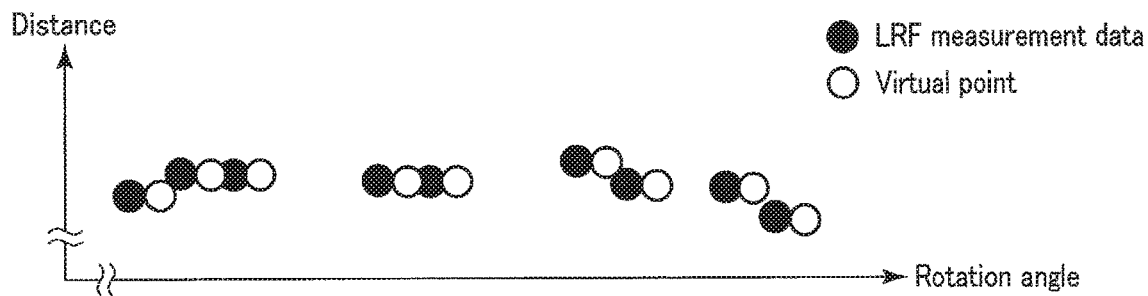
FIGS. 5A, 5B and 5C are diagrams illustrating the normalization performed by the measurement data processing unit shown in FIG. 1.
Figure 5B:
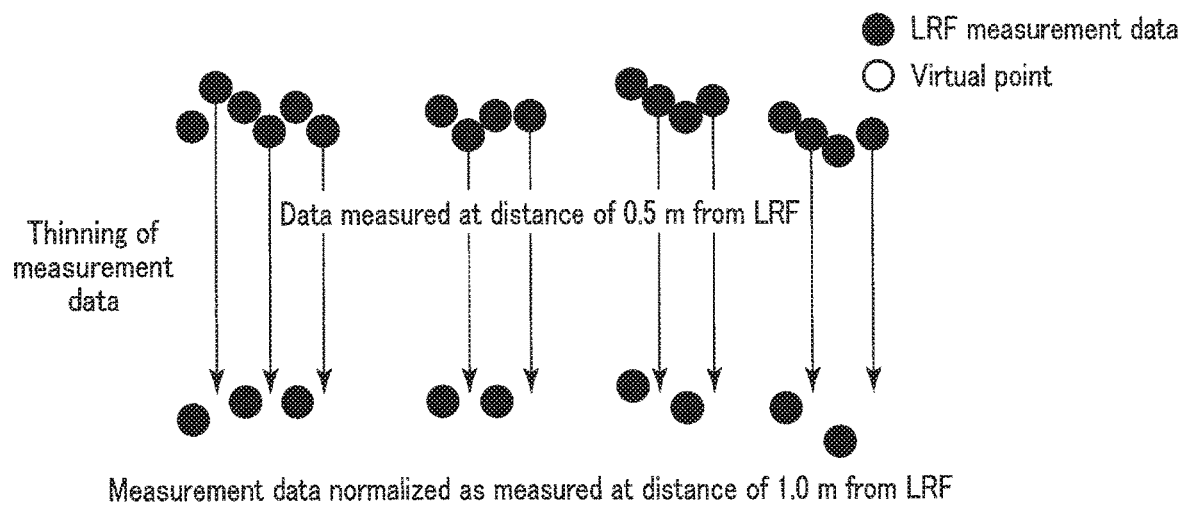
Figure 5C:
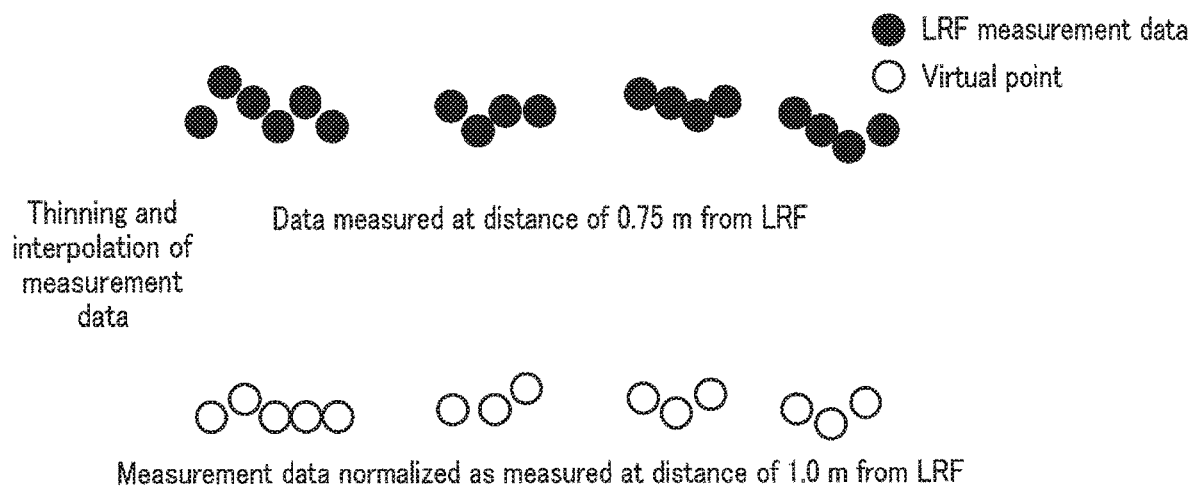

FIG. 5A schematically shows the measurement data obtained by the LRF 111 measuring the marker 200 shown in FIG. 2A. In FIG. 5A, the horizontal axis represents a rotational angle and the vertical axis represents a distance. The black circle represents the measurement data corresponding to the marker surface. Since the measurement data corresponding to each slit 202 of the marker 200 gives a larger distance, the measurement data corresponding to the slit 202 of the marker 200 does not appear in FIG. 5A. The white circle represents a virtual data point added by the data interpolation. FIGS. 5B and 5C each show an example of normalizing the measurement data into data as measured at a reference distance. FIG. 5B shows an example of normalizing data obtained by measurement at a distance of 0.5 meters from the LRF 111 into data as measured at the reference distance of 1 meter, where the normalization is done by the data thinning. FIG. 5C shows an example of normalizing data obtained by measurement at a distance of 0.75 meters from the LRF 111 into data as measured at the reference distance of 1 meter, where the normalization is done by the data thinning and interpolation.

In another example, the measurement data processing unit 121 calculates a posture to the LRF 111 of the marker surface candidate detected from the measurement data, and converts, based on the calculated posture, the measurement data corresponding to the marker surface candidate into data comparable with that obtained when the LRF 111 measures the marker 150 in front.

According to the present embodiment, the measurement data processing unit 121 performs both normalization using the distance to the marker 150 as discussed, and normalization using the posture. When the LRF 111 is arranged to be inclined towards the moving object 110, the measurement data processing unit 121 may correct distance data of the measurement data corresponding to the marker surface candidate according to the inclination angle.

Figure 6A:
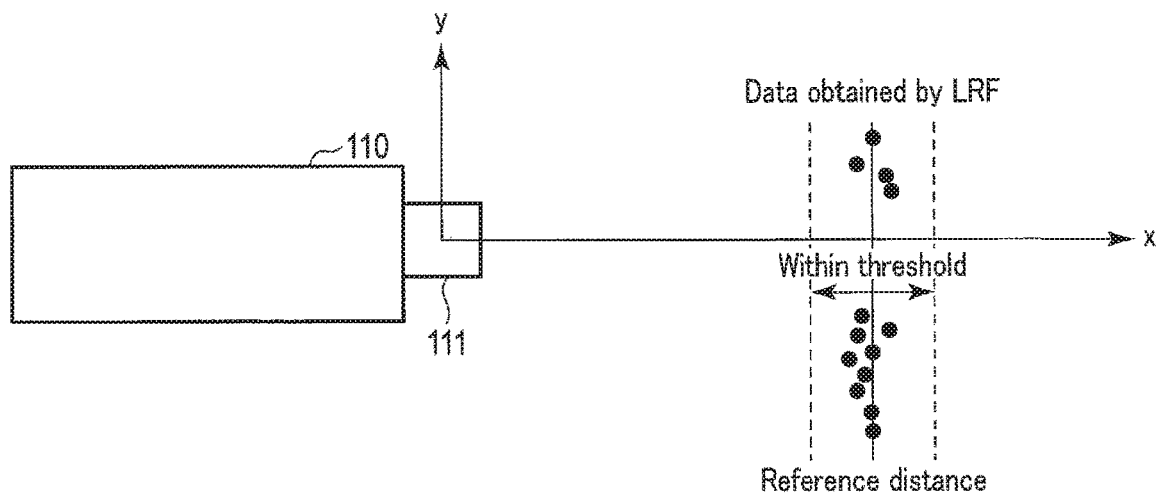
FIGS. 6A, 6B and 6C are diagrams illustrating the encoding performed by the measurement data processing unit shown in FIG. 1.
Figure 6B:
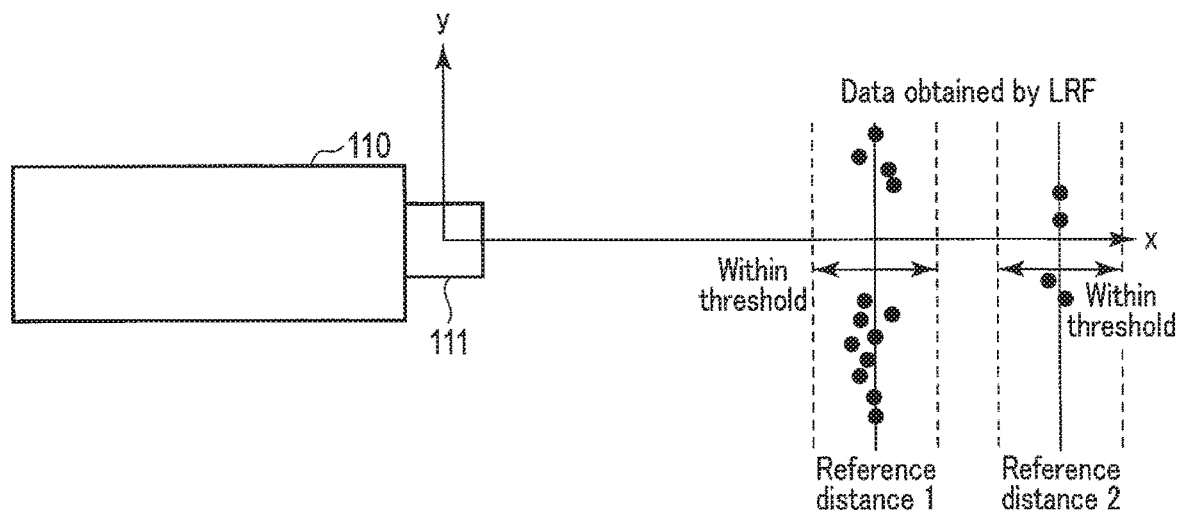

The measurement data processing unit 121 performs binarization or multi-valuing (also called multi-level processing) on the normalized measurement data to encode the measurement data. Specifically, the measurement data processing unit 121 encodes the normalized measurement data based on whether or not each distance indicated by the normalized measurement data falls within a predetermined range. FIG. 6A shows the encoding performed when the marker has a one-plane marker surface. In this case, the measurement data is binarized based on whether a value of the distance in the measurement data is within a threshold from the reference distance or not within the threshold. FIG.

6B shows the encoding performed when the marker has a two-plane marker surface. In this case, the measurement data is processed into multi-values (ternary values) based on whether a value of the distance in the measurement data is within a threshold from reference distance 1, or within a threshold from reference distance 2, or if no measurement data is available within either threshold. The multi-valuing may employ other methods such as a method of setting a plurality of thresholds for one reference distance and multi-valuing the measurement data based on which threshold range the measurement data is available in, and a method of multi-valuing the measurement data according to the cases of a value of the distance in the measurement data being within a threshold, being not within the threshold but showing a finite distance value, or being a preset value for the hardware of LRF 111. However, the method of multi-value processing is not limited to the above.

The following description assumes the method of binarization based on whether or not the measurement data is within a threshold from the reference distance; however, the embodiment is not limited to this. When performing the binarization for a value of the distance in the measurement data, a preset value for the hardware of LRF 111, obtained when there is no reflection due to a slit, is handled as being a representation of no measurement data within the threshold from the reference distance. Similarly, when performing the multi-value processing, such a preset value is handled as being a representation of no measurement data within the respective threshold. However, the embodiment of the encoding is not limited to the above.

Figure 6C:
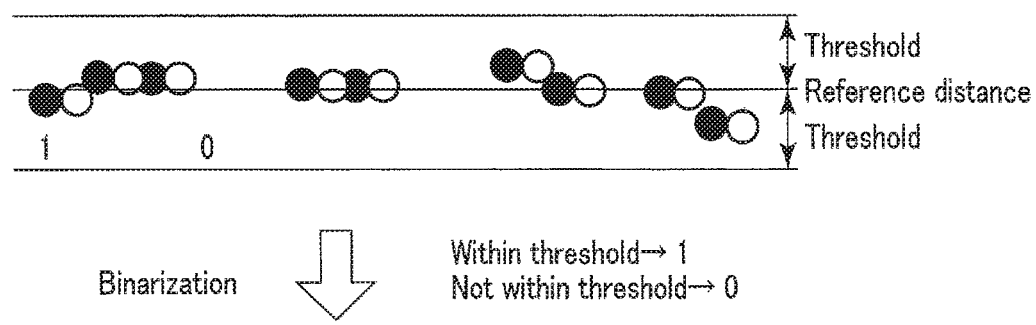

As shown in FIG. 6C, the measurement data processing unit 121, when the distance is included within a predetermined range, converts such a distance to 1, and when the distance is not included within the predetermined range, converts such a distance to 0. The predetermined range may be a range from a value conforming to the calculated distance to the marker 150 minus the threshold, to a value conforming to the calculated distance to the marker 150 plus the threshold.

In this manner, the measurement data processing unit 121 converts the measurement data into binary data and outputs the binary data to the decoder 122.

The decoder 122 receives the binary data from the measurement data processing unit 121, and converts the received binary data into a form (numerical values in the present embodiment) which can be used for referring to the marker database 130. The decoder 122 obtains the operation information of the moving object 110 by referring to the marker database 130 with the numerical value obtained by the conversion. In one example, the decoder 122 converts the binary data into a decimal number. For example, the decoder 122 converts data "10110001" to obtain "71". In another example, the decoder 122 obtains the number of "1" in the binary data. For instance, the decoder 122 obtains "4" from data "10110001". The decoder 122 uses the acquired numerical value as a key and obtains the operation information of the moving object 110 from the marker database 130 as a hash value.

The method employed by the decoder 122 for acquiring the operation information of the moving object 110 based on the binary data output from the measurement data processing unit 121 is not limited to the aforementioned examples.

Figure 7:
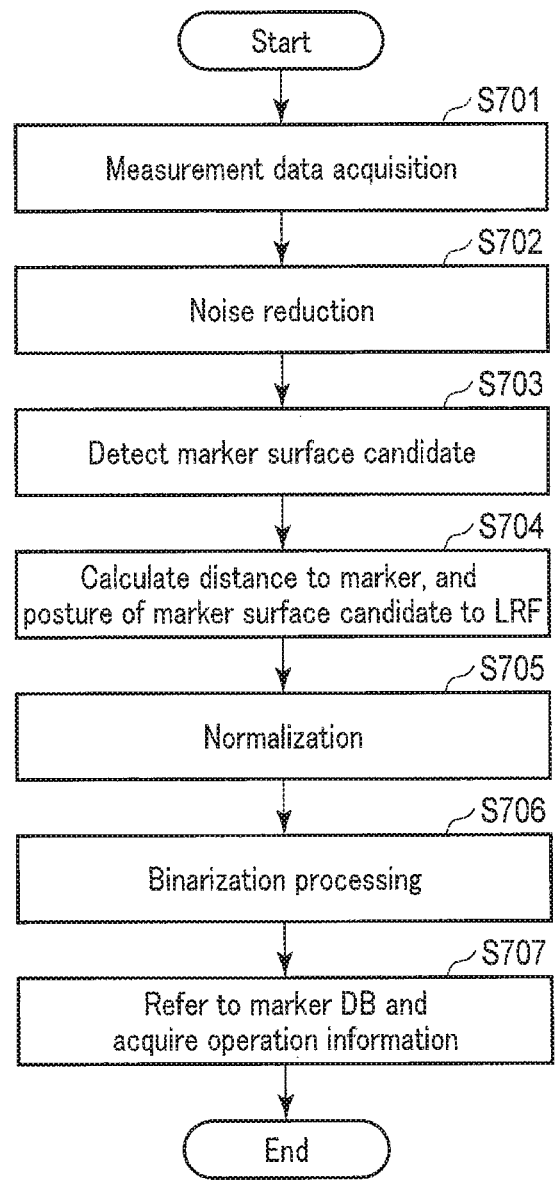
FIG. 7 is a flowchart showing a data processing method performed by the data processing apparatus shown in FIG. 1.

FIG. 7 schematically shows a procedural example of the data processing performed by the data processing apparatus 120. As shown in FIG. 7, the measurement data processing unit 121 acquires the measurement data obtained by measuring the marker 150 at the LRF 111 provided on the moving object 110 (step S701).

Next, the measurement data processing unit 121 performs the data processing on the measurement data according to the distance to the marker 150. For example, the measurement data processing unit 121 first performs noise reduction on the measurement data (step S702). The measurement data processing unit 121 then detects a marker surface candidate from the measurement data after the noise reduction (step S703). The measurement data processing unit 121 extracts measurement data corresponding to the marker surface candidate from the measurement data after the noise reduction, and calculates the distance to the marker 150 and the posture of the marker surface candidate with respect to the LRF 111 based on the extracted measurement data (step S704). The measurement data processing unit 121 normalizes the extracted measurement data according to the calculated distance and posture (step S705). For example, the measurement data processing unit 121 corrects the extracted measurement data according to the calculated posture, and performs data interpolation or data thinning on the corrected measurement data according to the calculated distance. In addition, the measurement data processing unit 121 binarizes the extracted and normalized measurement data based on whether or not each distance indicated by this measurement data falls within the predetermined range (step S706). The predetermined range is determined based on the calculated distance to the marker 150.

The decoder 122 acquires the operation information of the moving object 110 by referring to the marker database 130 with the data output from the measurement data processing unit 121 (step S707).

Therefore, the data processing apparatus 120 obtains the operation information of the moving object 110 that corresponds to the reflection characteristic pattern 151 of the marker 150.

As can be seen from the above, the moving object system 100 measures the marker 150 having the reflection characteristic pattern 151 with the LRF 111, and obtains the measurement data including distances to respective points. The data processing apparatus 120 detects the reflection characteristic pattern 151 based on the distances included in the measurement data, and obtains the operation information of the moving object 110 based on the detection result. For example, the reflection characteristic pattern 151 is formed by slits provided on the marker 150. In this case, the distances included in the measurement data show values that greatly differ between the marker main body and the slits. Thus, it is possible to successfully detect the reflection characteristic pattern 151 without being affected by the noise or distance precision of the LRF 111. By performing the pattern detection based on distance data as discussed, it is possible to accurately detect the reflection characteristic pattern 151. As a result, the operation information corresponding to the reflection characteristic pattern 151 can be obtained with accuracy. In addition, the reflection characteristic pattern 151 is allowed to use fine shapes, so that a variety of operation information can be dealt with.

Second Embodiment

Figure 8:
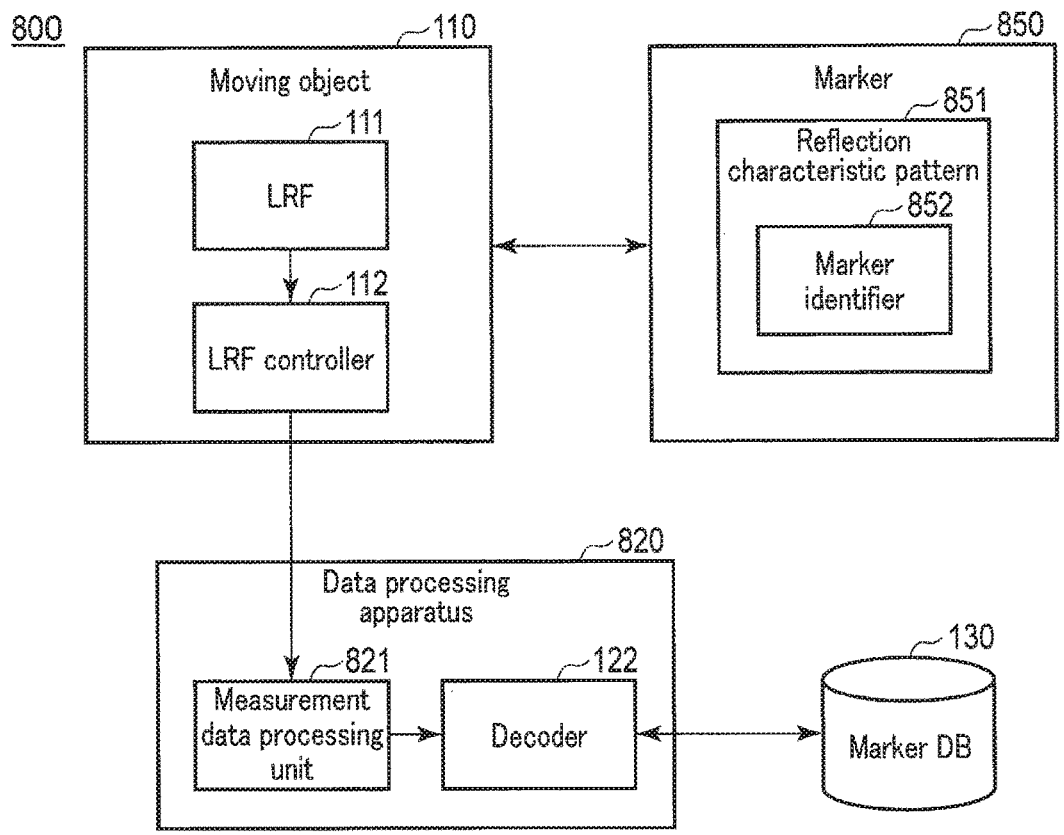
FIG. 8 is a block diagram showing a moving object system according to a second embodiment.

FIG. 8 schematically shows a moving object system 800 according to a second embodiment. In FIG. 8, elements which are the same or similar to those shown in FIG. 1 will be given the same or similar symbols, and overlapping explanations will be omitted. As shown in FIG. 8, the moving object system 800 includes a moving object 110, a data processing apparatus 820, and a marker database 130. The data processing apparatus 820 includes a measurement data processing unit 821 and a decoder 122.

In an environment where the moving object 110 moves, a marker 850 having a reflection characteristic pattern 851 is disposed. The marker 850 includes operation information of the moving object 110 and a marker identifier indicating the marker in the reflection characteristic pattern 851. In other words, the reflection characteristic pattern 851 includes a part corresponding to the operation information of the moving object 110 (operation information pattern), and a part corresponding to the marker identifier (identifier pattern).

Figure 9:
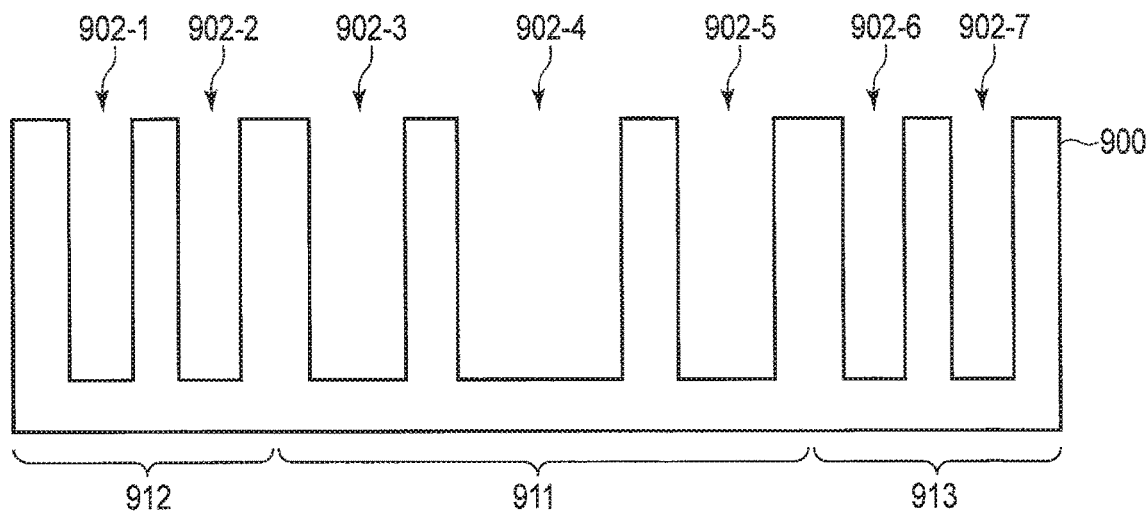

FIG. 9 is an elevational view schematically showing a marker 900 according to the second embodiment. The marker 900 shown in FIG. 9 is one example of the marker 850 shown in FIG. 8. The marker 900 is made of materials reflecting laser light from the LRF 111 and includes a reflection characteristic pattern formed by slits 902-1 to 902-7. The reflection characteristic pattern includes identifier patterns 912 and 913 and an operation information pattern 911 between the identifier patterns 912 and 913. The operation information pattern 911 is formed by the slits 902-3, 902-4, and 902-5, the identifier pattern 912 is formed by the slits 902-1 and 902-2, and the identifier pattern 913 is formed by the slits 902-6 and 902-7.

FIG. 10 is an elevational view schematically showing a marker 1000 according to the second embodiment. The marker 1000 shown in FIG. 10 is another example of the marker 850 shown in FIG. 8. The marker 1000 includes a two-dimensional reflection characteristic pattern formed by slits 1002-1 to 1002-8. The reflection characteristic pattern includes identifier patterns 1012 and 1013, and an operation information pattern 1011 between the identifier patterns 1012 and 1013. The operation information pattern 1011 is formed by the slits 1002-3 to 1002-6, the identifier pattern 1012 is formed by the slits 1002-1 and 1002-2, and the identifier pattern 1013 is formed by the slits 1002-7 and 1002-8.

In the aforementioned examples, the identifier pattern is positioned on opposite ends of the reflection characteristic pattern; however, the position of the identifier pattern is not limited to such. The identifier pattern may be provided in any place within the reflection characteristic pattern. The identifier pattern may be one.

The measurement data processing unit 821 differs from the measurement data processing unit 121 of the first embodiment in how marker surface candidates are detected. The measurement data processing unit 821 performs line detection using a Hough transform on the measurement data that is subjected to noise reduction and detects a marker surface candidate. The measurement data processing unit 821 performs identifier detection on the measurement data corresponding to the detected marker surface candidate. The identifier detection is, for example, performed based on whether or not there is data corresponding to a predetermined pattern on both ends of the marker surface candidate. This allows for determination of whether or not the marker surface can be correctly detected. For example, if a structure such as a wall is detected as a marker surface candidate, it is possible to exclude this marker surface candidate. When a plurality of marker surface candidates are detected, the measurement data processing unit 821 performs identifier detection on each of the marker surface candidates. Thus, it is possible to accurately detect the marker surface without an error.

FIG. 11 schematically shows a procedural example of the data processing performed by the data processing apparatus 820. In FIG. 11, the same symbols are given to the same processes as the processes shown in FIG. 7 and overlapping explanations will be omitted.

The data processing procedure shown in FIG. 11 adds the identifier detection to the data processing procedure shown in FIG. 7. The identifier detection is added between the detection of a marker surface candidate (step S703) and the calculation of a distance to the sensor and posture of the marker surface candidate (step S704). The measurement data processing unit 821 detects a marker surface candidate (step S703). Next, the measurement data processing unit 821 performs the identifier detection on the measurement data corresponding to the marker surface candidate (step S1101). The measurement data processing unit 821 performs the processes of steps S704 to S707 on the measurement data corresponding to the marker surface candidate whose identifier has been detected.

As can be seen from the above, in the second embodiment, the marker 850 includes the marker identifier 852 in the reflection characteristic pattern 851, and the data processing apparatus 820 performs the identifier detection on the detected marker surface candidate. It is therefore possible to determine whether or not the marker surface candidate corresponds to the marker 850. Therefore, the marker surface can be accurately detected.

Third Embodiment

FIG. 12 schematically shows a moving object system 1200 according to a third embodiment. In FIG. 12, elements which are the same or similar to those shown in FIGS. 1 and 3 will be given the same or similar symbols, and overlapping explanations will be omitted.

As shown in FIG. 12, the moving object system 1200 includes a moving object 1210, a data processing apparatus 820, a marker database 130, a moving object 1270, and a host system 1280. The moving object 1210 includes an LRF 111, an LRF controller 112, a moving object controller 1213, a communication unit 1214, and an information presentation unit 1215.

The moving object controller 1213 controls the moving object 1210. The moving object controller 1213 acquires operation information from the data processing apparatus 820 and controls the moving object 110 based on the acquired operation information. The control includes changing of a moving path, changing of a moving speed, stopping of movement, communication with the moving object 1270 through the communication unit 1214, communication with the host system 1280 through the communication unit 1214, presenting information through the information presentation unit 1215, updating surrounding environment information held by the moving object 1270, and updating a current self-location held by the moving object 1270. The moving object controller 1213 may perform controls other than the above.

The information presentation unit 1215 presents information received from the moving object controller 1213. The information presentation unit 1215 may present the operation information acquired from the data processing apparatus 820. The information presentation unit 1215 may present information indicating whether or not the acquisition of the operation information at the data processing apparatus 820 has been successful. The information presentation unit 1215 includes, but is not limited to, a display or a speaker. The information presentation manner includes, but is not limited to, images, video, sound, or voice. The information presentation unit 1215 may be arranged at any position, such as the front portion, rear portion, side portion etc. of the main body of the moving object, as long as it does not interrupt the measurement of the surrounding environment by the LRF 111.

The communication unit 1214 communicates with external apparatuses such as the moving object 1270 and the host system 1280. The communication unit 1214 transmits the operation information acquired from the data processing apparatus 820 to the moving object 1270 and the host system 1280. The method of communication between the moving object 1210 and the moving object 1270 or the host system 1280 may be a well-known method.

The moving object 1270 includes a main body including a moving mechanism, a moving object controller and a communication unit. The moving mechanism may be of any kind. The moving object 1270 may be a wheeled moving object which moves with wheels, a tracked moving object which moves with caterpillar wheels, or a walking moving object which walks with two or more legs. Further, the moving object 1270 may be a flying object apparatus.

The communication unit communicates with external apparatuses such as the moving object 1210 and the host system 1280. The communication unit receives the operation information from the moving object 1210. The moving object controller controls the moving object 1270 based on the operation information received from the moving object 1210. The control includes changing of a moving path, changing of a moving speed, stopping of movement, and updating surrounding environment information held by the moving object 1270.

The host system 1280 manages moving objects such as the moving object 1210 and other apparatuses present in the environment. The host system 1280 holds, e.g., information concerning an environment where the moving object moves, information concerning an operation status of the moving object, and information concerning the activation status of other apparatuses present in the environment. The host system 1280 receives information such as the operation information and measurement data from the moving object such as the moving object 1210 and updates its own held information based on the received information.

The host system 1280 may control the moving objects based on the information acquired from the moving objects. For example, the host system 1280 performs control such as updating environment information held by the moving object, stopping the moving object, and changing the moving path of the moving object. The host system 1280 controls the moving objects as necessary. For example, the host system 1280 determines the necessity of the control based on the operation status of the moving object and/or the activation status of other apparatuses. The host system 1280 may instruct a moving object to stop the movement if it is determined that the moving object should be stopped.

As can be seen from the above, the moving object 1210 transmits the operation information obtained by the data processing apparatus 820 to the moving object 1270 and the host system 1280. In such a manner, the moving objects in the system can be integrally controlled.

The processing described for each embodiment may be implemented by processing circuitry such as general-purpose hardware mounted on a computer.

Figure 13:
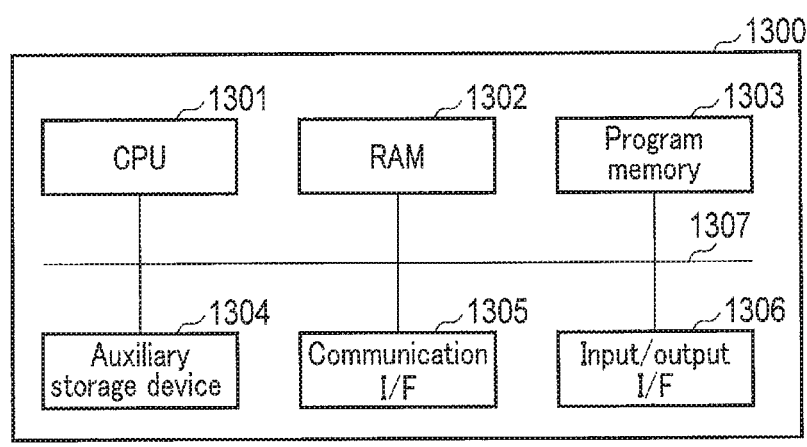
FIG. 13 is a block diagram showing a hardware configuration example of a computer according to an embodiment.

FIG. 13 is a block diagram showing a hardware configuration example of a computer 1300 according to an embodiment. As shown in FIG. 13, the computer 1300 includes, as a hardware, a CPU (central processing unit) 1301, a RAM (random access memory) 1302, a program memory 1303, an auxiliary storage device 1304, a communication interface 1305, an input/output interface 1306, and a bus 1307. The CPU 1301 communicates with the RAM 1302, program memory 1303, auxiliary storage device 1304, communication interface 1305, and input/output interface 1306 via the bus 1307.

The CPU 1301 is an example of a general-purpose hardware processor. The RAM 1302 is used as a working memory by the CPU 1301. The RAM 1302 includes a volatile memory such as an SDRAM (Synchronous Dynamic Random Access Memory). The program memory 1303 stores various programs including a data processing program. As the program memory 1303, for example, a ROM (Read-Only Memory), a part of the auxiliary storage device 1304, or a combination thereof is used. The auxiliary storage device 1304 stores data in a non-transitory manner. The auxiliary storage device 1304 includes a non-volatile memory such as a hard disk drive (HDD) or a solid state drive (SSD). The auxiliary storage device 1304 stores various data in a non-transitory manner. The auxiliary storage device 1304 may include the marker database 130.

The communication interface 1305 is an interface for communicating with external devices (for example, the moving object 110). The communication interface 1305 includes a wireless module such as for example, a wireless LAN (local area network) module. The input/output interface 1306 includes terminals for connecting an input device and an output device. An example of the input device includes a keyboard, mouse, microphone etc. An example of the output apparatus includes a display, speaker, etc.

Each program stored in the program memory 1303 includes computer-executable instructions. The program (computer-executable instructions), when executed by the CPU 1301, causes the CPU 1301 to perform predetermined processing. For example, when the data processing program is executed by the CPU 1301, it causes the CPU 1301 to perform the series of processing as described in relation to the measurement data processing unit and the decoder.

The program may be stored in a computer readable storage medium provided for the data processing apparatus 120. In such a case, for example, the data processing apparatus 120 further includes a drive (not shown) for reading data from the storage medium and obtains the program from the storage medium. The example of the storage medium includes a magnetic disk, an optical disk (CD-ROM, CD-R, DVD-ROM, DVD-R, etc.), a magneto-optical disk (MO, etc.), and a semiconductor memory. In addition, the program may be stored in a server on a communication network, and the data processing apparatus 120 may use the communication interface 1305 to download the program from the server.

It is not a requirement for the processing explained for the embodiments to be performed by a general-purpose processor such as the CPU 1301 executing the corresponding program, but the processing may be performed by a dedicated processor such as an ASIC (Application Specific Integrated Circuit). The term "processing circuitry" used herein includes at least one general-purpose hardware processor, at least one dedicated hardware processor, or a combination of at least one general-purpose hardware processor and at least one dedicated hardware processor. In the example shown in FIG. 13, the CPU 1301, RAM 1302 and program memory 1303 correspond to such processing circuitry.

Furthermore, the data processing apparatus (for example, data processing apparatus 120) is not required to be implemented as one computer (information processing apparatus). The data processing apparatus may be implemented as a plurality of computers. For example, the data processing apparatus may include a computer functioning as the measurement data processing unit (for example, measurement data processing unit 121) and a computer functioning as the decoder 122.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data processing apparatus comprising:
    processing circuitry configured to:
        perform data processing on measurement data including a plurality of distances according to a distance to a marker to obtain pattern data, the measurement data being obtained by measuring, by using a ranging sensor attached to a moving object, the marker of which surface includes a pattern with different reflection characteristics, the pattern data indicating the pattern of the marker, wherein the data processing comprises generating the pattern data from the distances included in the measurement data, and wherein the generating the pattern data comprises normalizing the measurement data according to the distance to the marker, and encoding the normalized measurement data based on whether or not each distance indicated by the normalized measurement data is within a predetermined range; and
        acquire operation information of the moving object based on the pattern data obtained by the data processing, the operation information including information unrelated to an object on which the marker is disposed.

2. A data processing apparatus comprising:
    processing circuitry configured to:
        perform data processing on measurement data including a plurality of distances according to a distance to a marker to obtain pattern data, the measurement data being obtained by measuring, by using a ranging sensor attached to a moving object, the marker of which surface includes a pattern with different reflection characteristics, the pattern data indicating the pattern of the marker, wherein the data processing comprises encoding the measurement data to generate the pattern data, the encoding the measurement data comprising converting a distance of the plurality of distances to a first value when the distance is within a predetermined range and converting the distance to a second value different from the first value when the distance is not within the predetermined range; and
        acquire operation information of the moving object based on the pattern data obtained by the data processing.

3. The data processing apparatus according to claim 2, wherein the encoding comprises multi-valuing.

4. The data processing apparatus according to claim 3, wherein the multi-valuing is binarization.

5. The data processing apparatus according to claim 1, wherein the normalization comprises at least one of data interpolation or data thinning.

6. The data processing apparatus according to claim 1, wherein the data processing further comprises calculating the distance to the marker based on at least one of the distances included in the measurement data.

7. The data processing apparatus according to claim 1, wherein the processing circuitry is configured to acquire operation information of the moving object corresponding to the pattern by referring to a marker database using the pattern data obtained by the data processing, the database storing a set of operation information of the moving object.

8. The data processing apparatus according to claim 1, wherein the pattern includes an identifier indicating the marker.

9. The data processing apparatus according to claim 1, wherein the processing circuitry is further configured to control the moving object based on the acquired operation information of the moving object.

10. The data processing apparatus according to claim 1, wherein the processing circuitry is further configured to transmit the acquired operation information of the moving object to another moving object or a host system.

11. The data processing apparatus according to claim 1, wherein the processing circuitry is further configured to present the acquired operation information of the moving object.

12. The data processing apparatus according to claim 1, wherein the pattern is formed by a slit in the marker.

13. A moving object apparatus comprising:
    the data processing apparatus according to claim 1;
    the moving object; and
    the ranging sensor.

14. A data processing method comprising:
    performing data processing on measurement data including a plurality of distances according to a distance to a marker to obtain pattern data, the measurement data being obtained by measuring, by using a ranging sensor attached to a moving object, the marker of which surface includes a pattern with different reflection characteristics, the pattern data indicating the pattern of the marker, wherein the data processing comprises generating the pattern data from the distances included in the measurement data, and wherein the generating the pattern data comprises normalizing the measurement data according to the distance to the marker, and encoding the normalized measurement data based on whether or not each distance indicated by the normalized measurement data is within a predetermined range; and
    acquiring operation information of the moving object based on the pattern data obtained by the data processing, the operation information including information unrelated to an object on which the marker is disposed.

15. A non-transitory computer readable medium including computer executable instructions, wherein the instructions, when executed by a processor, cause the processor to perform a method comprising:
    performing data processing on measurement data including a plurality of distances according to a distance to a marker to obtain pattern data, the measurement data being obtained by measuring, by using a ranging sensor attached to a moving object, the marker of which surface includes a pattern with different reflection characteristics, the pattern data indicating the pattern of the marker, wherein the data processing comprises generating the pattern data from the distances included in the measurement data, and wherein the generating the pattern data comprises normalizing the measurement data according to the distance to the marker, and encoding the normalized measurement data based on whether or not each distance indicated by the normalized measurement data is within a predetermined range; and acquiring operation information of the moving object based on the pattern data obtained by the data processing, the operation information including information unrelated to an object on which the marker is disposed.

16. The data processing apparatus according to claim 1, wherein the operation information is information to be used to control an operation of the moving object.

17. The data processing apparatus according to claim 1, wherein the operation information includes at least one of no-entry area information specifying a no-entry area, speed-limit area information specifying an area where a speed limit is imposed and indicating an upper speed limit, one-way traffic area information specifying a one-way area and showing a direction allowing passage, one-side traffic area information specifying a one-side traffic closure area, human work presence/absence information indicating whether or not a person is working in an area, or moving object presence/absence information indicating whether or not another moving object is present in an area.

* * * * *